(12) United States Patent
Lange

(10) Patent No.: US 11,992,847 B2
(45) Date of Patent: May 28, 2024

(54) SYSTEM FOR REDUCING DUST EMISSIONS RESULTING FROM TIRE ABRASION

(71) Applicant: TECHNISCHE UNIVERSITAET DRESDEN, Dresden (DE)

(72) Inventor: Matthias Lange, Pirna (DE)

(73) Assignee: TECHNISCHE UNIVERSITAET DRESDEN, Dresden (DE)

( * ) Notice: Subject to any disclaimer, the term of this patent is extended or adjusted under 35 U.S.C. 154(b) by 470 days.

(21) Appl. No.: 17/432,300

(22) PCT Filed: Mar. 17, 2020

(86) PCT No.: PCT/EP2020/057265
§ 371 (c)(1),
(2) Date: Aug. 19, 2021

(87) PCT Pub. No.: WO2020/200761
PCT Pub. Date: Oct. 8, 2020

(65) Prior Publication Data
US 2022/0168750 A1  Jun. 2, 2022

(30) Foreign Application Priority Data
Apr. 3, 2019  (DE) .................. 10 2019 204 743.2

(51) Int. Cl.
*B03C 1/033* (2006.01)
*B03C 1/035* (2006.01)
(Continued)

(52) U.S. Cl.
CPC ............ *B03C 1/0332* (2013.01); *B03C 1/035* (2013.01); *B03C 1/14* (2013.01); *B03C 1/30* (2013.01);
(Continued)

(58) Field of Classification Search
CPC .......... B03C 1/0332; B03C 1/035; B03C 1/14; B03C 1/30; B03C 2201/20;
(Continued)

(56) References Cited

U.S. PATENT DOCUMENTS

2005/0000197 A1  1/2005 Krantz
2010/0077848 A1  4/2010 Ulicny et al.
(Continued)

FOREIGN PATENT DOCUMENTS

| CN | 105148627 A | * 12/2015 | ................ B60S 1/68 |
| CN | 105 337 334 | 2/2016 | |

(Continued)

OTHER PUBLICATIONS

International Search Report.
German Examination Report.

*Primary Examiner* — Frank M Lawrence, Jr.
(74) *Attorney, Agent, or Firm* — Jacobson Holman PLLC

(57) ABSTRACT

A system for reducing dust emissions resulting from tire abrasion, comprising a collecting unit (1), arranged at a distance from the tread (4) of a tire (5) and has at least one first electromagnet and/or permanent magnet (2). At least the material with which the tread (4) of the tire (5) is formed is magnetic or is ferromagnetically, ferrimagnetically or anti-ferromagnetically magnetisable, so that the tire abrasion particles (6) created as a result of abrasion of the tread (4) are magnetic or are ferromagnetically, ferrimagnetically or anti-ferromagnetically magnetisable. The at least one first electromagnet and/or permanent magnet (2) is designed to magnetise tire abrasion particles (6) and to accumulate the magnetized tire abrasion particles (6) detached from the material of the tread (4) in a collection point (3), arranged on a vehicle.

10 Claims, 1 Drawing Sheet

(51) Int. Cl.
*B03C 1/14* (2006.01)
*B03C 1/30* (2006.01)
*B60R 19/00* (2006.01)

(52) U.S. Cl.
CPC .......... *B60R 19/00* (2013.01); *B03C 2201/20* (2013.01); *B03C 2201/24* (2013.01); *B03C 2201/30* (2013.01); *B60R 2019/002* (2013.01)

(58) Field of Classification Search
CPC ... B03C 2201/24; B03C 2201/30; B03C 1/10; B03C 1/0335; B60R 19/00; B60R 2019/002; B60C 19/00; B62D 25/161
USPC .......................................................... 95/28
See application file for complete search history.

(56) References Cited

U.S. PATENT DOCUMENTS

| | | | | |
|---|---|---|---|---|
| 2017/0210354 | A1* | 7/2017 | Mathissen | B03C 3/00 |
| 2022/0379667 | A1* | 12/2022 | Gelb | B60C 19/00 |
| 2023/0338969 | A1* | 10/2023 | Cheng | B03C 3/45 |

FOREIGN PATENT DOCUMENTS

| | | |
|---|---|---|
| DE | 40 12 277 | 10/1991 |
| DE | 199 54 825 | 5/2001 |
| JP | S63 287646 | 11/1988 |

* cited by examiner

SYSTEM FOR REDUCING DUST EMISSIONS RESULTING FROM TIRE ABRASION

BACKGROUND OF THE INVENTION

The invention relates to a system for reducing dust emissions due to tire abrasion, wherein the tire abrasion can be captured by means of a magnetic effect.

In addition to exhaust gases from fuel combustion, the abrasion of elastomer particles and plastic particles caused by vehicle tires belongs to the greatest environmental pollution due to motor vehicles. In Germany alone, tire abrasion amounts to a weight of 120,000 metric tons (tonnes) a year according to scientific estimates. Due to their chemical composition, the tire abrasion particles are hardly able to be biologically degraded and are absorbed by a large number of organisms in which they can accumulate and result in damage to health.

This problem cannot even be managed by the introduction of electromobility since electrically powered vehicles also cause tire abrasion. These vehicles even release more tire abrasion due to the comparatively high starting torque so that it has to be assumed that the dust pollution due to tire abrasion will increase further as electromobility advances.

It has previously been known from the prior art to filter abrasion particles from storm drains by means of filter media. However, a comprehensive filtering of all storm drains would be very complex and/or expensive. In addition, it would only be the aquatic environment that would be protected from contamination by tire abrasion, and indeed only slightly since tire abrasion that is not flushed into the storm drains cannot be captured.

Another solution approach comprises filtering the tire abrasion from the air by means of filter media on vehicle floors or at stationary filter stations at the side of the road. However, this is associated with a very high energetic effort and also noise emissions since large amounts of air have to be circulated. The filter power is additionally dependent on the weather and frequently drops considerably in moisture or wet.

Only particles of a specific size range can moreover be captured. Larger particles sink to the ground fast so that they can no longer be caught by suction systems at the vehicle floor or at the side of the road, while smaller particles are very easily taken along and swirled over a large area due to their small weight so that they cannot be sucked in at the vehicle floor or at the side of the road. This is particularly disadvantageous since in particular very small particles cannot only penetrate into the bronchial tubes, but also into the pulmonary alveoli and blood vessels of the human body and represent a high health risk.

SUMMARY OF THE INVENTION

It is therefore the underlying object of the present invention to overcome the disadvantages known from the prior art and to provide a method of reducing dust emissions due to tire abrasion.

This object is achieved in accordance with the invention by a system in accordance with the claims.

A system for reducing dust emissions due to tire abrasion has a capturing unit having at least one first electromagnet and/or permanent magnet. The capturing unit is arranged at a distance on the tread of a tire, with at least the material by which the tread of the tire is formed being magnetic or being ferromagnetically, ferrimagnetically, or antiferromagnetically magnetizable so that the tire abrasion particles arising due to abrasion of the tread on the use of the tire are magnetic or are ferromagnetically, ferrimagnetically, or antiferromagnetically magnetizable. The at least one first electromagnet and/or permanent magnet of the capturing unit is furthermore configured to magnetize the magnetic or ferromagnetically, ferrimagnetically, or antiferromagnetically magnetizable tire abrasion particles and to accumulate the magnetic or ferromagnetically, ferrimagnetically, or antiferromagnetically magnetizable tire abrasion particles that are released from the material of the tread at a collection point that is arranged on a vehicle. A use of the tire can here be understood as a locomotion of the tire by means of a rolling movement on a surface that can also comprise acceleration procedures and deceleration procedures.

The emission of tire abrasion into the environment can thus be prevented by the system immediately on the use of the tire directly at the production site. The tire abrasion particles can be directed in a specific manner by means of the magnetic field of the at least one first electromagnet and/or permanent magnet produced close to the tire and can be collected and concentrated at the collection site. The system can preferably be fixable or fixed to or in the wheel arch or the wheel suspension of a land craft or aircraft for this purpose.

The collection site is advantageously configured with a surface that is located in a region of the magnetic field of the at least one first electromagnet and/or permanent magnet in which the magnetic field strength and/or the gradient of the magnetic field strength is at a maximum or at least very high in the direction of the at least one first electromagnet and/or permanent magnet. The surface by which the collection site is formed is preferably aligned perpendicular to a magnetic field direction of the at least one first electromagnet and/or permanent magnet so that the tire abrasion particles are directed in the direction of the surface and are held or accumulated at this surface due to the magnetic interaction with the magnetic field of the at least one first electromagnet and/or permanent magnet.

The collection point can, for example, be formed by a surface of the at least one first electromagnet and/or permanent magnet. Alternatively, the system can also comprise a filter, a deposition chamber, and/or a container releasably connected to the system. The collection site can be arranged at or in the filter or deposition chamber or container and the magnetic or ferromagnetically, ferrimagnetically, or antiferromagnetically magnetizable tire abrasion particles can be accumulated. This has the advantage that the surface of the at least one first electromagnet and/or permanent magnet is protected from permanently adhering contaminants or encrustations of tire abrasion particles since the collection site is spatially separate from the surface of the at least one first electromagnet and/or permanent magnet.

It can furthermore be prevented by the filter, the deposition chamber, and/or the container, in particular a cartridge, releasably connected to the system that the tire abrasion particles accumulated at the collection site are unintentionally carried out of the system by airflow or other environmental influences. The accumulated tire abrasion particles can additionally be removed from the system and supplied to an environmental sound disposal in an uncomplicated manner by means of a releasable or replaceable filter and/or container.

The filter can be configured with a filter medium at or in which the tire abrasion particles can be accumulated by means of the magnetic field of the at least one first electromagnet and/or permanent magnet. The filter can in particular be equipped with a replaceable filter medium. Alternatively or additionally, the filter can be configured as an electrostatic filter so that the tire abrasion particles also adhere to the filter by means of electrostatic attraction. The filter is particularly preferably configured as a magnetic filter so that the tire abrasion particles adhere to the filter by means of a magnetic attraction between the filter and the tire abrasion particles. The filter can be configured as a conductor flown through by current for this purpose or can be configured with a magnetic or ferromagnetically, ferrimagnetically, or antiferromagnetically material at whose surface the tire abrasion particles can accumulate.

The tire abrasion particles accumulated at the collection point can be released from the collection site by switching off, shielding, or reversing the polarity of the at least one first electromagnet and/or permanent magnet, or by removing, reversing the polarity, or shielding the at least one permanent magnet or applying a magnetic field of the opposite polarity. The collection site can in particular be arranged in the system for this purpose such that the released tire abrasion particles are releasable from the collection site or from the system by means of gravity. The system can furthermore also have a release device by which the accumulated tire abrasion particles can be mechanically and pneumatically released from the collection site or can be released by means of a fluid flushing agent. Encrusted or agglomerated tire abrasion particles can thus also be released fast and completely.

The distance between the at least one first electromagnet and/or permanent magnet and the tread of the tire typically amounts to between 20 mm and 200 mm. The at least one first electromagnet and/or permanent magnet is preferably formed or is arranged in or at the capturing unit in such a way as to form a magnetic field for the accumulation of the tire abrasion particles that is aligned in the region of the minimal distance between the at least one first electromagnet and/or permanent magnet and the tread of the tire at an angle between 0° and 90°, preferably between 0° and 60°, to the surface normal of the tread of the tire.

The at least one first electromagnet and/or permanent magnet is particularly preferably configured or arranged in or at the capturing unit to form a magnetic field that leads the tire abrasion particles away in the direction of an outflow direction of the tire and supplies them to the collection site on the use of the tire. I.e. the tire abrasion particles can be transported away and transported to the collection site by the adhesion flow that is generated by the rolling tire. The kinetic energy of the tire abrasion particles can also be used, in addition to the magnetic attraction forces between the tire abrasion particles and the at least one first electromagnet and/or permanent magnet, to supply them to the collection site and to accumulate them there. The capture rate of the tire abrasion particles can thereby be increased or a larger distance can be made possible between the at least one first electromagnet and/or permanent magnet and the tread of the tire. Alternatively or additionally to this, the system can comprise a suction device or a flow channel that is configured to conduct the magnetic or ferromagnetically, ferrimagnetically, or antiferromagnetically tire abrasion particles in the direction of the at least one first electromagnet and/or permanent magnet or of the collection site on the use of the tire.

The capturing unit can be configured with one or more first electromagnets and/or permanent magnets. The at least one electromagnet and/or permanent magnet can in particular be configured or arranged to form a magnetic field that has magnetic field directions sectionally oriented in reverse to one another on the tread. The magnetic flux circuit of the at least one electromagnet and/or permanent magnet can be closed via a non-ferromagnetically or non-ferrimagnetically or non-antiferromagnetically magnetizable substructure of the tread of the tire that has a higher magnetic permeability than the tread such as a non-magnetizable steel belt to avoid a deeper penetration of the magnetic flux into the tire and to avoid any unwanted inductive effects in the rims of the tire.

Alternatively or additionally, the system can be configured with a plurality of capturing units. This has the advantage that tire abrasion particles can be accumulated from a large region of the tread of the tire and the system can be adapted to the dimensions or to the aerodynamics of specific tires or wheel arches or wheel suspensions.

The capturing unit is preferably configured with at least one first permanent magnet. The system can thus be operated in a very energy saving and low maintenance manner since no energy is required for the formation of the magnetic field with the permanent magnet or magnets. The at least one first permanent magnet can in particular be configured as a movable, i.e. translatorily travelable, pivotable, and/or rotatable permanent magnet so that the magnetic field strength at the collection site can be controlled via the distance or the orientation of the at least one permanent magnet with respect to the collection site.

The at least one first permanent magnet of the capturing unit is particularly preferably configured as an array of a plurality of permanent magnets, in particular as an array in a Halbach arrangement. The permanent magnets can be aligned or arranged in or at the capturing unit such that their magnetic fields are superposed and the flux density of the resulting magnetic field is amplified in the direction of the collection point for the accumulation of the tire abrasion particles while the flux density on the side of the array remote from the collection site of the array is weakened.

The use of an array having a plurality of permanent magnets is particularly advantageous when the capturing unit is configured with a curved surface and the permanent magnets are arranged thereat. The system can thereby be configured in a very space saving manner and can be flexibly adapted to the existing construction space and/or the flow profile at the tire can be adapted for the retrofitting to existing motor vehicles. In addition, no shielding or only a low shielding of the magnetic field with respect to the environment is necessary at the surfaces of the array that are not directed toward the collection point.

In addition to the at least one first electromagnet and/or permanent magnet, the system can have at least one second electromagnetic and/or permanent magnet that is configured and/or arranged in the system to magnetize the tread of the tire before the abrasion of the tire abrasion particles. The at least one second electromagnetic magnet and/or permanent magnet is preferably configured to magnetize the tread of the tire before the abrasion of the tire abrasion particles in a defined magnetization direction with opposite polarity to the magnetization direction of the at least one first electric magnet and/or permanent magnet.

The material by which the tread of the tire is formed preferably has a rubber mixture that comprises at least 1 volume %, particularly preferably at least 10 volume %, of magnetic or ferromagnetically or ferrimagnetically or antiferromagnetically magnetizable particles. The material can here in particular be contained in a coating of the tread, with the coating advantageously being formed with a thickness that is greater than the tread depth of the tire.

The magnetic or ferromagnetically, ferrimagnetically, or antiferromagnetically magnetizable particles of the rubber mixture are typically present in the rubber mixture as finely distributed nanoparticles or microparticles, i.e. the magnetic or ferromagnetically, ferrimagnetically, or antiferromagnetically magnetizable particles have diameters in the range between 5 nm and 500 µm, with the particles also being able to be present as agglomerates. The particles can additionally have a coating so that they are better crosslinkable with the rubber mixture and/or are protected against oxidation.

Particles or materials are called magnetic that can also have a permanent ferromagnetic, ferrimagnetic, or antiferromagnetic magnetization in the absence of an external magnetic field, in particular a permanent magnetization greater than 0.5 T and a coercive field strength greater than 1 kA/m. The ferromagnetically, ferrimagnetically, or antiferromagnetically magnetizable particles are preferably soft magnetically magnetizable particles, i.e. particles that have a small remanence magnetization less than 0.5 T and a small coercive field strength less than 1 kA/m. The particles can, for example, consist of or comprise iron, e.g. carbonyl iron, or soft magnetic iron compounds or alloys, e.g. ferrites, iron sulfides, or alloys of iron aluminum and/or iron silicon. The soft magnetically magnetizable particles particularly preferably comprise biocompatible materials, i.e. materials that are non-toxic and not harmful to the environment. The particles can in particular consist of or comprise magnetite or maghemite.

The system can furthermore be equipped with at least one sensor that is configured to detect the amount of tire abrasion particles accumulated at the collection point, in particular the mass or the layer thickness of the tire abrasion particles accumulated at the collection site. The sensor can, for example, be configured as an acoustic, optical, or inductive sensor. The sensor can additionally be connected to the control system of the vehicle that can trigger an automatic cleaning of the tire abrasion particles from the collection site or can provide the operator with an indication of the necessity of cleaning or of any disturbances of the system.

In the method of reducing dust emissions due to tire abrasion, a tire is provided that has at least one tread that is formed by material that is magnetic or is ferromagnetically, ferrimagnetically, or antiferromagnetically magnetizable so that the tire abrasion particles arising due to abrasion of the tread on the use of the tire are magnetic or are ferromagnetically, ferrimagnetically, or antiferromagnetically magnetized. The magnetic or ferromagnetically, ferrimagnetically, or antiferromagnetically magnetizable tire abrasion particles arising due to abrasion of the tread are magnetized by means of at least one first electromagnet and/or permanent magnet and are accumulated at a collection site that is arranged on a vehicle.

The emission of tire abrasion into the environment can thus be directly prevented at the polluter by the method. The method described can be carried out using the device described, that is the device described is configured to carry out the described method.

DESCRIPTION OF THE DRAWINGS

Embodiments of the invention are shown in the drawings and will be explained in the following with reference to FIGS. 1 to 2.

There are shown.

DETAILED DESCRIPTION OF THE INVENTION

Figure 1:
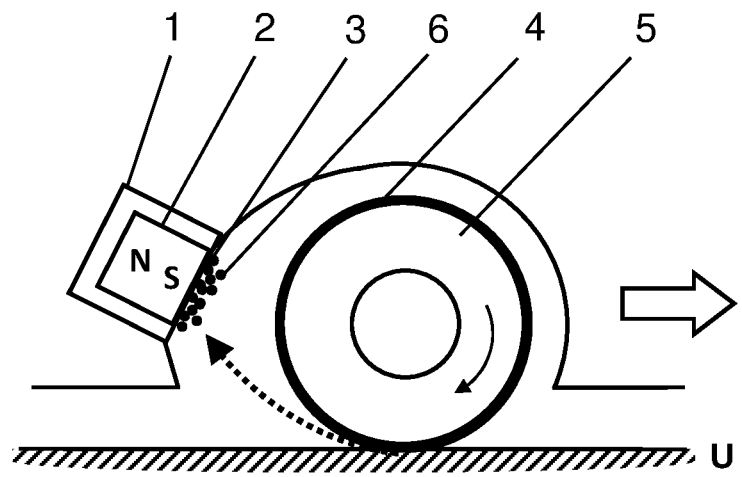
FIG. 1: in a schematic view, an embodiment of a system for reducing dust emissions due to tire abrasion.

An embodiment of a system for reducing dust emissions due to tire abrasion is shown in a schematic view in FIG. 1. The system has a capturing unit 1 having at least one first electromagnet and/or permanent magnet 2. The capturing unit 1 is arranged at a distance on the tread 4 of a tire 5, with at least the material by which the tread 4 of the tire 5 is formed being magnetic or being ferromagnetically, ferrimagnetically, or antiferromagnetically magnetizable so that the tire abrasion particles 6 arising due to abrasion of the tread 4 on the use of the tire 5 are magnetic or are ferromagnetically, ferrimagnetically, or antiferromagnetically magnetizable. The at least one first electromagnet and/or permanent magnet 2 is configured to magnetize these magnetic or ferromagnetically, ferrimagnetically, or antiferromagnetically magnetizable tire abrasion particles 6 and to accumulate or deposit them at a collection site 3. The dust emission of tire abrasion into the environment can thus be reduced on the use of the tire 5 directly at the production site, i.e. close to the tire. A use of the tire 5 is here understood as the locomotion of the tire by 5 means of a rolling movement on a surface U that can also comprise acceleration procedures and deceleration procedures. The direction of locomotion and the rolling movement of the tire 5 on the surface U are shown by a bordered or a solid arrow in FIG. 1.

In the example shown, the system is fixed or integrated in the wheel arch of a vehicle. The tread 4 of the tire 5 is formed by a material that comprises an optimized rubber mixture with carbonyl iron particles. The soft magnetically magnetizable tire abrasion particles 6 are shown as black dots in the not-to-scale representation of FIG. 1. The field alignment of the magnetic field of the at least one first electromagnet and/or permanent magnet 2 is marked by N for the negative magnetic pole and S for the positive magnetic pole in the illustration, with an alignment of the magnetic field with a reverse polarity also being possible.

The magnetic field of the at least one first electromagnetic and/or permanent magnet 2 is formed at an angle of 0° to 90° to the normal of the tread 4 of the tire 5, with the magnetic field being aligned approximately perpendicular to the tread 4 in the region of the smallest distance between the at least one first electromagnet and/or permanent magnet 2 and the tread 4.

The magnetic field direction of the at least one first electromagnet and/or permanent magnet 2 is additionally oriented approximately in parallel with an outflow direction of the rolling tire 5. The outflow direction is shown by a dashed line in the drawing. I.e. the at least one first electromagnet and/or permanent magnet 2 is arranged with respect to the tread 4 of the tire 5 that the magnetic field of the at least one first electromagnet and/or permanent magnet 2 leads off the tire abrasion particles 6 in the direction of an outflow of the rolling tire 5 on a forward movement of the tire 5 and supplies them to the collection site 3. The collection site 3 is formed in the shown example of FIG. 1 by the surface of the at least one first electromagnet and/or permanent magnet 2.

Provision can alternatively be made that a plurality of capturing units 1 are arranged around the tire 5 in the system so that a configuration of the system with respect to the aerodynamics of the rolling tire can be dispensed with or streamlines and the tire abrasion particles 6 can be simply collected from a region of the tread 4 that is as large as possible. This is particularly advantageous for tires 5 that are approximately fully covered by the wheel arch since the full covering of the tire provides a fastening option or installation option for the system that has a large area.

Figure 2:
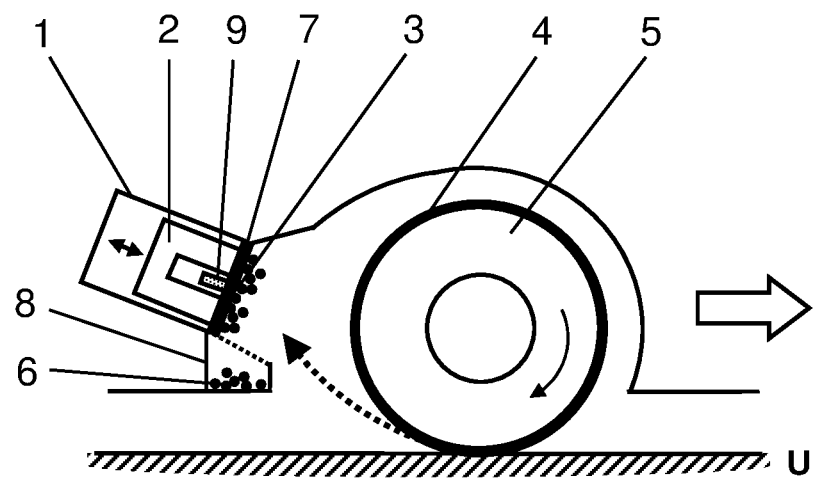
FIG. 2: in a schematic view, a further embodiment of a system for reducing dust emissions due to tire abrasion.

A further embodiment of a system for reducing dust emissions due to tire abrasion is shown in a schematic view in FIG. 2. Repeating elements are provided with identical reference numerals in this Figure.

The capturing unit is configured with a double arm yoke magnet 2, i.e. one arm of the permanent magnet 2 has a magnetically positive polarity and the other arm has a magnetically negative polarity. This has the advantage, on the one hand, that a larger area at which the tire abrasion particles can be accumulated can be provided at the collection site 3 by the two poles. On the other hand, the circuit of the magnetic flux of the permanent magnet 2 is closed via the yoke. The magnetic scatter field around the capturing unit 1 can thereby be reduced and the effort for the magnetic shielding of the capturing unit 1 can thus also be reduced. With correspondingly configured tires 5 that have a metallic substructure below the tread 5, the magnetic flux of the permanent magnet 2 can be closed via the substructure of the tread 4 of the tire 5.

Alternatively to a yoke magnet, the at least one first electromagnet and/or permanent magnet 2 can also be configured as an array of a plurality of permanent magnets 2 in a Halbach arrangement. In this respect, the magnets 2 are arranged with respect to one another such that their magnetic fields are positively superposed on a side of the array that faces the collection site 3 and thereby amplify the magnetic field of the array, while the magnetic fields of the individual permanent magnets 2 on the oppositely disposed side of the array approximately mutually cancel one another out so that the scatter field and the effort for the magnetic shielding of the capturing unit 1 can be reduced at this side of the array, the side remote from the collection site 3.

The collection site 3 is formed in the example of FIG. 2 as a surface 7 that is spatially separate from the surface of the at least one first electromagnet and/or permanent magnet 2, but is arranged in the magnetic field of the at least one first electromagnet and/or permanent magnet 2 for the accumulation of the tire abrasion particles 6. The tire abrasion particles 6 can thereby be collected during the use of the tire 5 directly at the site of their release, but the surface of the at least one first electromagnet or permanent magnet 2 is protected from contamination due to permanent adhesions of tire abrasion particles 6. The collection site 3 can alternatively also be formed as a surface of a filter, an inner surface of a deposition chamber, or as an inner surface of a container releasably fastenable in the system and open in the direction of the tread 4.

A sensor 9 is additionally arranged at the collection site 3 by which the amount or layer thickness of the tire abrasion particles 6 accumulated at the collection site 3 can be determined so that the release of the tire abrasion particles 6 from the collection site 3 can be initiated on a reaching of a critical amount of tire abrasion particles 6. The sensor 9 is an ultrasound sensor that is arranged in the capturing device 1 in the example of FIG. 2.

In the example of FIG. 2 shown, the at least one first electromagnet and/or permanent magnet 2 is configured as a movable or travelable permanent magnet 2 and can, as indicated by a double arrow in FIG. 2, be removed from the collection site 3 so that the distance from the collection site 3 is increased and the magnetic field strength of the permanent magnet 2 thus falls at the collection site 3 and the accumulated tire abrasion particles 6 are releasable from the collection site 3. A release device can additionally also be provided at the collection site 3 by which the accumulated tire abrasion particles 6 are mechanically and pneumatically releasable from the collection site 3 or are releasable by means of a flushing agent.

The tire abrasion particles 6 can, as shown in the example of FIG. 2, be released from the collection site 3 by gravity in the direction of a capturing container 8 and can be collected in this capturing container 8. The capturing container 8 can, for example, be formed as a replaceable cartridge so that the tire abrasion particles 6 can be removed from the system together with the cartridge and can be supplied to an environmentally sound disposal.

Only features of the different embodiments disclosed in the embodiments can be combined with one another and claimed individually independently of the respective example.

The invention claimed is:

1. A system for reducing dust emissions due to tire abrasion comprising a capturing unit having at least one first electromagnet and/or permanent magnet, wherein
   the capturing unit is arranged at a distance from tread of a tire; and
   at least material by which the tread of the tire is formed is magnetic or is ferromagnetically, ferrimagnetically, or antiferromagnetically magnetizable so that tire abrasion particles arising due to abrasion of the tread of the tire are magnetic or are ferromagnetically, ferrimagnetically, or antiferromagnetically magnetizable; and
   the at least one first electromagnet and/or permanent magnet is configured to magnetize the magnetic or ferromagnetically, ferrimagnetically, or antiferromagnetically magnetizable tire abrasion particles and to accumulate the magnetic or ferromagnetically, ferrimagnetically, or antiferromagnetically magnetizable tire abrasion particles that are released from the tread at a collection site that is arranged on a vehicle.

2. The system in accordance with claim 1, wherein the system has a filter, a deposition chamber, or a container releasably connected to the system, at or in which the collection site is arranged and the magnetic or ferromagnetically, ferrimagnetically, or antiferromagnetically magnetizable tire abrasion particles can be accumulated.

3. The system in accordance with claim 1, wherein the system has a release device by which the accumulated tire abrasion particles can be mechanically and pneumatically released from the collection site and/or can be released by means of a flushing agent.

4. The system in accordance with claim 1, wherein the at least one first electromagnet and/or permanent magnet is configured and/or arranged in the capturing unit to form a magnetic field that is aligned at an angle of 0° to 90° to a surface normal of the tread in the region of the smallest distance between the first electromagnet and/or permanent magnet and the tread of the tire.

5. The system in accordance with claim 1, wherein the at least one first electromagnet and/or permanent magnet is configured and/or arranged in the capturing unit to form a magnetic field that directs the tire abrasion particles to the collection site.

6. The system in accordance with claim 1, wherein the system has a suction device and/or a flow channel that is configured to conduct the magnetic or ferromagnetically, ferrimagnetically, or antiferromagnetically magnetizable tire abrasion particles in the direction of the at least one electromagnet and/or permanent magnet and/or to the collection site during driving.

7. The system in accordance with claim 1, wherein the at least one first electromagnet and/or permanent magnet is configured and/or arranged to form a magnetic field that has magnetic fields sectionally oriented in reverse to one another at the tread and its flow circuit is closed via a non-magnetizable substructure of the tread that has a higher magnetic permeability than the tread.

8. The system in accordance with claim 1, wherein at least material by which the tread of the tire is formed has a rubber mixture that comprises at least 1 volume % of soft magnetically ferromagnetically, ferrimagnetically, or antiferromagnetically magnetizable particles.

9. The system in accordance with claim 1, wherein the system has at least one sensor that is configured to detect amount of accumulated tire abrasion particles at the collection site.

10. A method of reducing fine dust due to tire abrasion,
- a tire is provided that which has at least one tread that is formed by material that is magnetic or ferromagnetically, ferrimagnetically, or antiferromagnetically magnetizable so that tire abrasion particles created due to abrasion of the tread during driving are magnetic or ferromagnetically, ferrimagnetically, or antiferromagnetically magnetized by means of at least one first electromagnetic and/or permanent magnet; and accumulating
- the magnetic or ferromagnetically, ferrimagnetically, or antiferromagnetically magnetized tire abrasion particles by means of the at least one first electromagnetic and/or permanent magnet at a collection site that is arranged on a vehicle.

* * * * *